United States Patent [19]

Brooks

[11] Patent Number: 5,267,386
[45] Date of Patent: Dec. 7, 1993

[54] METHOD OF SECURING A MEMBER TO A HEAT SOFTENABLE MATERIAL

[75] Inventor: Anthony J. Brooks, Livonia, Mich.

[73] Assignee: Ford Motor Company, Dearborn, Mich.

[21] Appl. No.: 986,183

[22] Filed: Dec. 7, 1992

[51] Int. Cl.$^5$ .............................................. B32B 7/08
[52] U.S. Cl. .................................. 29/432.1; 29/433; 29/525; 29/525.1; 227/156; 411/446
[58] Field of Search .................... 29/432, 432.1, 432.2, 29/525, 525.1, 433; 72/200, 703; 227/156; 411/446, 456; 470/36, 35, 34; 264/1.4, 154, 249; 362/80, 365, 366, 368

[56] References Cited

U.S. PATENT DOCUMENTS

| | | |
|---|---|---|
| 24,586 | 6/1859 | Snyder et al. ............... 411/446 |
| 985,737 | 2/1911 | Fischer ....................... 470/34 |
| 1,442,969 | 1/1923 | Pope ........................... 470/34 |
| 2,763,878 | 9/1956 | Hemann ...................... 470/34 |
| 3,032,644 | 5/1962 | McGrew, Jr. . | 
| 4,206,499 | 6/1980 | Urbanek et al. . |
| 4,604,679 | 8/1986 | Rolando et al. . |
| 4,761,871 | 8/1988 | O'Connor et al. ........... 29/432.1 |
| 4,953,065 | 8/1990 | Kao . |

FOREIGN PATENT DOCUMENTS

| | | | |
|---|---|---|---|
| 2462407 | 4/1977 | Fed. Rep. of Germany | 227/156 |
| 53-82077 | 12/1978 | Japan . | |
| 47904 | 4/1979 | Japan ..................... | 227/156 |
| 58-218440 | 12/1983 | Japan . | |
| 198687 | 9/1965 | Sweden . | |
| 2005986 | 5/1979 | United Kingdom ...... | 227/156 |

Primary Examiner—Timothy V. Eley
Attorney, Agent, or Firm—Damian Porcari; Roger L. May

[57] ABSTRACT

A method and apparatus for securing a member to a heat softenable material comprising the steps of heating the member to a temperature sufficient to soften the softenable material and driving the member into the material. The material softens from the heat of the member and becomes displaced by the member. Knurling may be added to the member to aid in retention.

9 Claims, 1 Drawing Sheet

METHOD OF SECURING A MEMBER TO A HEAT SOFTENABLE MATERIAL

FIELD OF THE INVENTION

The present invention relates to a method of fastening a heat softenable material. More specifically, the invention relates to a method of using a hot wire to soften the material and securely fasten the wire to it.

BACKGROUND OF THE INVENTION

Heat softenable materials include a large variety of substances, the largest of which is thermoplastics. These materials soften and become flowable when heated above a specific temperature.

Various means of securing plastic materials exist including a variety of mechanical fasteners and adhesives. In the area of securing lamp assemblies comprising a lens and a reflector, adhesives are used to bond the lens assembly to the reflector in a U-shaped channel. Mechanical fasteners such as screws or steel clips are used to temporarily retain the lens to the reflector until the adhesive has had an opportunity to cure. Screws and clips require predrilling or preloading the plastic component to receive the fastener. Screws and clips also require complicated handling and assembly techniques.

The present invention disclosures a low cost and high speed method of securing fasteners within heat softenable materials. The method and apparatus eliminate handling individual fasteners such as screws and clips and permits a low cost feed stock such as wire to act as the fastener.

SUMMARY OF THE INVENTION

The present invention disclosures a method and apparatus for securing a member to a heat softenable material comprising the steps of heating the member to a temperature sufficient to soften the softenable material and driving the member into the material whereby the material softens and is displaced by the member. The member may be knurled to provide additional retention within the heat softenable material. The member may be made from a low cost elongated rod or wire. When using coiled wire, an apparatus according to the present invention may dispense incremental portions of wire to act as fasteners. Once the wire is inserted within the heat softenable material, it is severed flush with the surface of the material to provide an attractive appearance. The apparatus disclosed permits rapid insertion of fasteners and lends itself to automation with robotic equipment. A length of wire is uncoiled to form a linear portion. The wire is passed through a means which indexes it forward a discrete amount. The indexing means may optionally form knurling on the wire to aid in retention. The wire may be heated by a variety of means including conductive, inductive or radiant heating.

DESCRIPTION OF THE PREFERRED EMBODIMENT

The invention will be illustrated as a method and apparatus for fastening an automotive lens/reflector assembly. Other uses of the invention are also possible and include fastening two or more heat softenable materials or fastening objects to heat softenable materials. The invention may also be used for adding structure or reinforcement to heat softenable materials by inserting reinforcement members in critical areas.

The heat softenable materials described are generally thermoplastic such as polycarbonate, ABS and acrylic. However, the method and apparatus is useful for other types of heat softenable materials such as rubber and glass.

Figure 1:
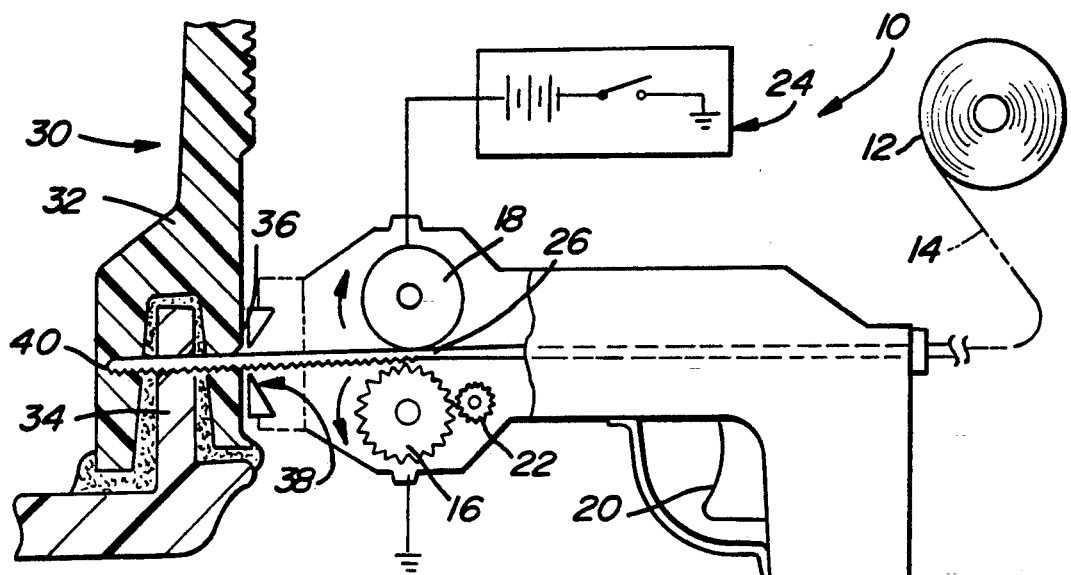
FIG. 1 is a schematic of the apparatus inserting a member within a lens/reflector assembly.

Illustrated in FIG. 1 is apparatus 10 for driving a member within a heat softenable material. Apparatus 10 receives a coil of wire 12. Wire 12 may be made of a suitable metal material such as stainless steel, copper, aluminum or brass. Wire 12 should be conductive and receptive to knurling. A portion 14 of wire 12 is uncoiled and formed into a generally linear shape. Portion 14 is inserted between knurling roller 16 and roller 18. Roller 16 and 18 act to form a knurled surface on portion 14 as well as advancing wire 12. Illustrated in FIG. 1 is roller 16 having triangularly shaped teeth about its periphery. Roller 16 forms triangularly shaped barbs on portion 14.

Advancing trigger 20 operates a driving motor 22 to rotate roller 16 in the direction indicated. Portion 14 is advanced linearly outward from apparatus 10 a predetermined distance. Portion 14 is simultaneously heated during advancement. Various methods of heating portion 14 are possible including conduction, induction, and radiant heating. Illustrated in FIG. 1 is a method of heating portion 14 with conductive heating. Rollers 16 and 18 are made from a conductive material and are connected to electric circuit 24. During the advancement of wire 14, circuit 24 is closed thus energizing rollers 16 and 18. Portion 14 in the area 26 communicates with both rollers 16 and 18 and heats due to conductive heating. The heat within area 26 radiates within portion 14 heating tip 40.

Figure 2:
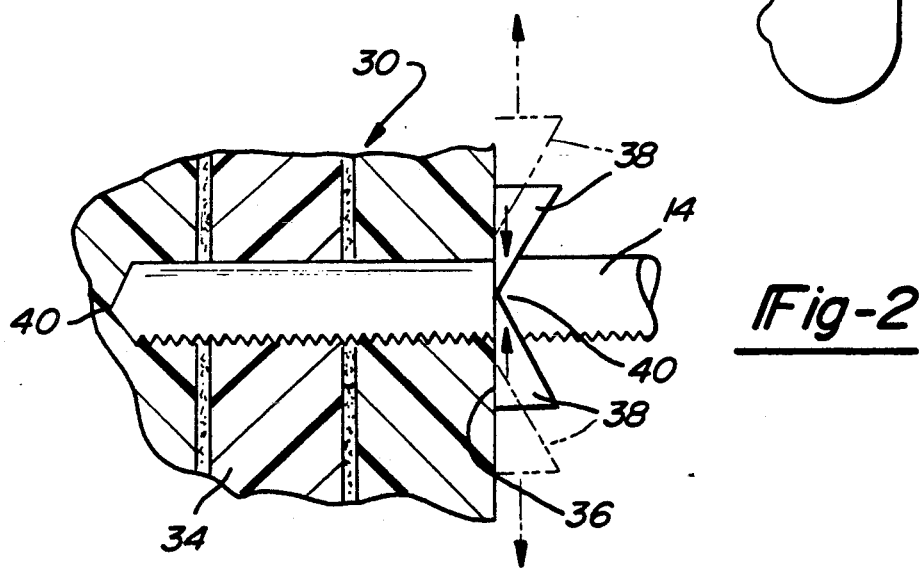
FIG. 2 illustrates the apparatus described in FIG. 1 severing the member.

Apparatus 10 is placed adjacent the item receiving portion 14. The item illustrated in FIG. 1 is a detailed portion of an automotive lens and reflector assembly 30. Assembly 30 comprises a U-shaped channel 32 receiving an L shaped lip 34. Channel 32 and lip 34 are made from heat softenable material such as thermoplastics. Apparatus 10 is placed juxtaposed surface 36 of channel 32. Portion 14 is driven through channel 32 and lip 34 to securely fasten assembly 30. Trigger 20 is either manually or robotically operated to simultaneously heat and index portion 14 forward a distance. Portion 14 is heated to a temperature above the heat softening temperature of assembly 30. The material within assembly 30 is displaced by portion 14. After portion 14 is indexed a predetermined distance, shears 38 severe portion 14 substantially flush with surface 36, as illustrated in FIG. 2. As portion 14 cools., the material of assembly 30 resolidifies and firmly secures portion 14 within assembly 30. Shears 38 may be designed to form a chisel point 40 on severed portion 14 to assist insertion within assembly 30 and to reduce the size of portion 14 visible from surface 36.

Figure 3:
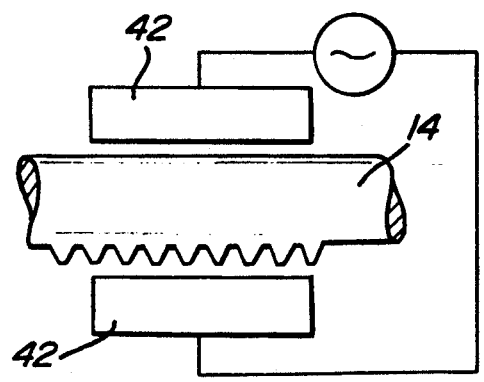
FIG. 3 is an alternative embodiment of an inductive heater.

Illustrated in FIG. 3 is an alternative embodiment of the apparatus shown in FIG. 1 using inductive heating to heat portion 14. Electrically isolated electrodes 42 placed adjacent portion 14 are connected to an oscillating electric or magnetic field. Portion 14 is heated inductively to a temperature sufficient to soften assembly 30.

The invention has been illustrated as a means for securing two components into an assembly. The invention may be used to fasten items onto a heat softenable surface or add reinforcement to a heat softenable article.

I claim:

1. A method of securing a member to a heat softenable material comprising the steps of:
   providing a coiled wire;
   uncoiling said wire and forming a substantially lineal member;
   heating said member adjacent said material to a temperature sufficient to soften said material; and
   driving said member into said material, whereby said material softens and is displaced by said member.

2. The method of claim 1, further comprising knurling said member during said heating step.

3. The method of claim 1, wherein said member has a surface and further comprising severing said member substantially flush with said surface.

4. The method of claim 1, wherein said heating step comprises conductively heat said member between two electrodes.

5. The method of claim 1, wherein said heating step comprises inductively heating said member between two electrodes.

6. A method of securing a plastic lens and reflector assembly, said assembly having a U-shaped channel and L-shaped lip comprising the steps of:
   engaging said lip between first and second upstanding portions of said channel;
   driving a hot wire through an exterior surface of said first portion, through said lip and into said second portion; and
   severing said wire substantially flush with said exterior surface.

7. The method of claim 6, further comprising knurling said wire before said driving step 8. The method of claim 6, wherein said hot wire is heated substantially simultaneously with said driving step.

9. The method of claim 6, wherein said wire is coiled, said method further comprises uncoiling said wire and forming a substantially lineal section.

* * * * *